(12) United States Patent
Reed et al.

(10) Patent No.: US 8,926,263 B2
(45) Date of Patent: Jan. 6, 2015

(54) TURBOMACHINE CASING ASSEMBLY

(75) Inventors: Julian M. Reed, Derby (GB); Cedric B. Harper, Derby (GB)

(73) Assignee: Rolls-Royce plc, London (GB)

( * ) Notice: Subject to any disclaimer, the term of this patent is extended or adjusted under 35 U.S.C. 154(b) by 368 days.

(21) Appl. No.: 13/358,080

(22) Filed: Jan. 25, 2012

(65) Prior Publication Data

US 2012/0224958 A1 Sep. 6, 2012

(30) Foreign Application Priority Data

Mar. 4, 2011 (GB) .................................. 1103682.9

(51) Int. Cl.
*F01D 25/24* (2006.01)
*F01D 21/04* (2006.01)
*F02K 3/06* (2006.01)

(52) U.S. Cl.
CPC .............. *F01D 25/24* (2013.01); *F01D 21/045* (2013.01); *F01D 25/243* (2013.01); *F02K 3/06* (2013.01); *F05D 2250/283* (2013.01); *Y02T 50/672* (2013.01)
USPC ........................................... 415/9; 415/174.4

(58) Field of Classification Search
CPC .......... F16C 25/083; F16F 1/027; F16F 1/328
USPC ................ 415/9, 174.2, 174.4, 196, 197, 200
See application file for complete search history.

(56) References Cited

U.S. PATENT DOCUMENTS

| | | | | |
|---|---|---|---|---|
| 4,149,824 A | * | 4/1979 | Adamson | 415/9 |
| 4,411,589 A | * | 10/1983 | Joubert et al. | 415/9 |
| 4,648,795 A | * | 3/1987 | Lardellier | 415/196 |
| 6,206,631 B1 | * | 3/2001 | Schilling | 415/9 |
| 6,227,794 B1 | * | 5/2001 | Wojtyczka et al. | 415/9 |

FOREIGN PATENT DOCUMENTS

| | | |
|---|---|---|
| EP | 0 795 682 A1 | 9/1997 |
| EP | 1 087 104 A2 | 3/2001 |
| EP | 1 336 739 A2 | 8/2003 |
| GB | 2 422 407 A | 7/2006 |
| GB | 2 427 436 A | 12/2006 |
| GB | 2469447 A | 10/2010 |

OTHER PUBLICATIONS

British Search Report dated Jun. 7, 2011 issued in British Patent Application No. 1103682.9.

* cited by examiner

*Primary Examiner* — Nathaniel Wiehe
*Assistant Examiner* — Woody A Lee, Jr.
(74) *Attorney, Agent, or Firm* — Oliff PLC

(57) ABSTRACT

A turbomachine casing assembly including: a first casing element arrangeable adjacent to one or more rotating aerofoil structures of a turbomachine; a second casing element provided at a radially outer position with respect to the first casing element; and an infill member disposed between the first and second casing elements, wherein an end of the infill member is set back from an end of the first casing element such that a void is provided between the first and second casing elements.

9 Claims, 2 Drawing Sheets

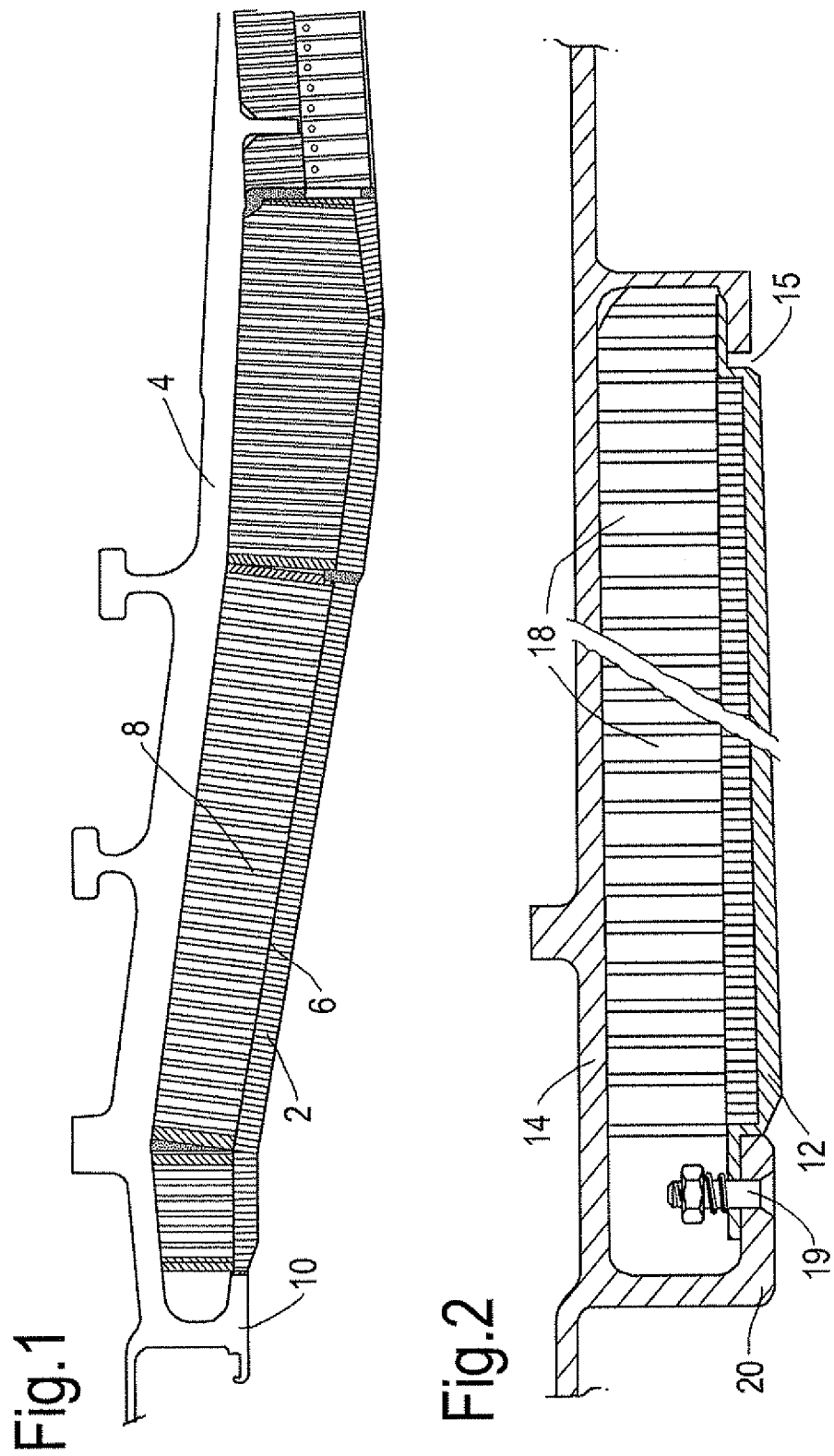

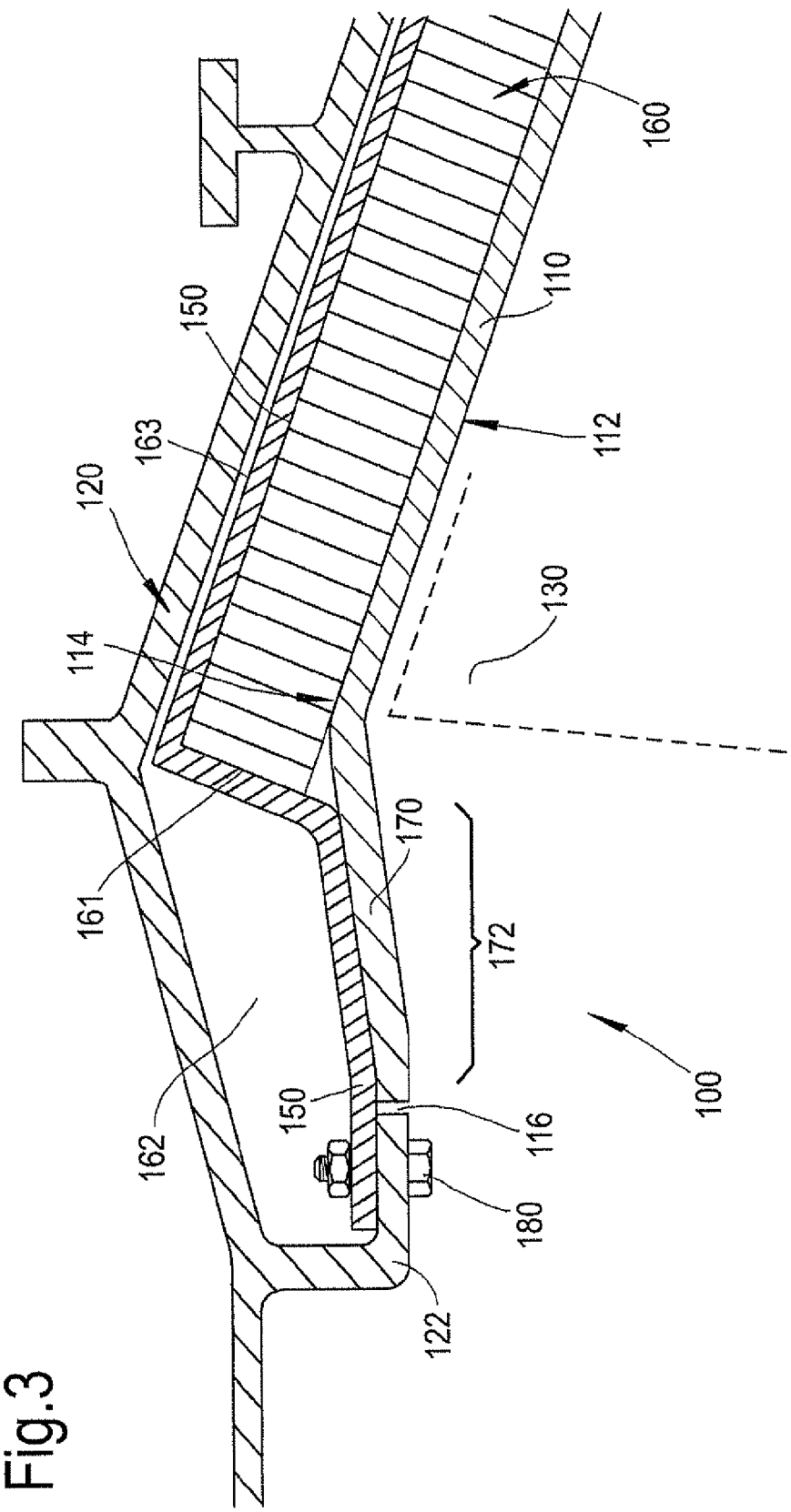

TURBOMACHINE CASING ASSEMBLY

This invention claims the benefit of UK Patent Application No. 1103682.9, filed on 4 Mar. 2011, which is hereby incorporated herein in its entirety.

FIELD OF THE INVENTION

This invention relates to a turbomachine casing assembly and particularly but not exclusively relates to a casing assembly for the fan of a jet engine.

FIG. 1 shows a conventional fan track liner 2 which is bonded directly to the fan case 4 of a typical jet engine. When an aerofoil or fan blade (not shown) is unintentionally released, for example due to a bird strike, the fan blade travels tangentially but has the appearance of moving radially outwards penetrating the attrition liner 2, septum 6 and aluminium honeycomb 8 until it reaches the metallic casing 4. During this time, the fan blade tip travels forwards where it is captured by a hook 10 to prevent further axial forward movement thereby containing the fan blade. Furthermore, by providing an adequate thickness of the aluminium honeycomb 8, the remaining fan blades, which are still attached to the rotor assembly, are prevented from machining away the casing 4 during subsequent run on of the jet engine. The aluminium honeycomb 8 therefore acts as a void filler/spacer which positions the attrition liners 2 in the correct radial and axial position, whilst accommodating the orbiting rotor assembly. The aluminium honeycomb 8 also needs to be rigid enough to support the attrition liner 2 to prevent damage during ice impacts when ice is shed from the rotor assembly.

In addition to the fan blade-off scenario described above, fan blade to attrition liner interactions (rubs) may occur for the following further reasons:
- Casing distortion as a result of gyroscopic effects during excessive aircraft manoeuvres;
- Casing distortion as a result of a heavy landing;
- Fan blade 'dig in' due to blade untwist during bird or Foreign Object Damage (FOD) impacts; and
- Sudden fan blade speed increase.

Following a heavy tip rub, the fan track will suffer severe damage in the form of either trenches machined into the liner, or worse the liner may be ripped out which could be hazardous to the aircraft. Aerodynamic performance is also affected to such an extent that the liner either requires repair or replacement at the earliest opportunity. This is both time consuming and costly to the airline. Another problem is that heavy tip rubs cause fan blade tip bluing which affects the life of the fan blade. The fan track liner could also be irreversibly damaged by ice impacting onto the surface, FOD or bird impacts.

The load on the track liner due to ice shedding from the fan blade may vary along the axial length of the liner. For example, ice is typically shed from the rear of a blade with greater frequency and energy and this impacts towards the rear of the attrition layer. By contrast, some ice may be shed from the leading edge of the blade, which may travel axially forward to impact the attrition liner forward of the blade tip. This forward shed ice may be shed at a lower frequency and with a lower energy than the majority of the rearward shed ice. Typically it is only a swept blade that may shed ice forward of the tip with the shed ice having a significant energy level due to the leading edge profile which sweeps axially forward at the blade tip. Unswept blades typically shed ice rearward with an ice energy profile having the energy density rearward of the blade tip and with minimal low energy ice being shed forward of the leading edge By contrast, a shed blade may travel forwards and the ability of a fan blade to penetrate the liner may depend on the resistance that the liner is able to offer to the collapsing blade. Accordingly, it is desirable that a fan track liner is strong enough to resist ice impact, but is also weak enough to allow the fan blade to cut through during a fan blade off event.

In this regard, a problem with the prior art arrangements, e.g. as shown in FIG. 1, is that they offer the same resistance to fan blade off loads and fan blade ice shedding loads all along their length. The result of this may be that the liner may withstand the shed ice loads, but may be too strong for the fan blade tip to penetrate the liner and engage the hook during a fan blade-off.

To this end a previously-proposed casing assembly with a honeycomb filler 18 is shown in FIG. 2. As shown, the fan track liner 12 is hinged with respect to the casing 14 at pivot point 15 and resiliently attached via a sprung fastener 19 at hook 20. The previously-proposed casing assembly shown in FIG. 2 therefore presents a different stiffness along the length of the track liner 12 such that a fan blade may penetrate the fan track liner at a forward point (in the case of a blade off event), whilst remaining rigid to ice impact at the rear as this is closer to the hinge 15. However, a disadvantage of this previously-proposed arrangement is that stiffness may vary linearly along the length of the liner and the strengths of the liner upstream and downstream of the blade are not sufficiently different to best match the differing requirements mentioned above.

The present invention therefore seeks to address these issues.

STATEMENTS OF INVENTION

According to an aspect of the present disclosure there is provided a turbomachine casing assembly comprising: a first casing element arrangeable adjacent to one or more rotating aerofoil structures of a turbomachine; a second casing element provided at a radially outer position with respect to the first casing element; and a liner arranged between the first and second casing elements, wherein an infill member disposed between the first and second casing elements is arranged between the liner and the first casing assembly, wherein an end of the infill member is set back from an end of the first casing element such that a void is provided between the first and second casing elements, the void being arranged between the liner and the second casing element.

The infill member may be provided between a first portion of the first and second casing elements. The void may be provided between a second portion of the first and second casing elements. The first and second portions of the first and second casing elements may be adjacent to one another, e.g. in an axial sense.

The void may be filled with a further infill member. The further infill member may be weaker than the infill member.

The first casing element may comprise a cantilever. The cantilever may be arranged in a region between the end of the first casing element and a leading edge of the aerofoil structure. The cantilever may be arranged such that upon failure of one of the rotating aerofoil structures, the cantilever bends into the void provided between the first and second casing elements.

The void and infill member may be separated by the liner. The liner may be affixed to the infill member.

The turbomachine casing assembly may further comprise a septum layer. The septum layer may be arranged between the infill member and the first casing element, for example in the first portion of the first and second casing elements. The septum layer may be further arranged between the liner and the first casing element, for example in the second portion of the first and second casing elements. The septum may be affixed to one or more of the first casing portion, the infill member and the liner.

The turbomachine casing assembly may further comprise an aerofoil structure retaining feature. The aerofoil structure retaining feature may be provided adjacent to the end of the first casing element. The second casing element may comprise the aerofoil structure retaining feature. The aerofoil structure retaining feature may resist movement of one of the rotating aerofoil structures upon failure of one of the rotating aerofoil structures. The aerofoil structure retaining feature may comprise a hook.

The liner and/or septum layer may overhang the first casing element. The liner and/or septum layer may engage the aerofoil structure retaining feature.

The turbomachine casing assembly may further comprise a fastener arranged to connect the first casing element to the second casing element. The fastener may connect the first casing element to the aerofoil structure retaining feature. The fastener may be frangible. The fastener may connect the second casing element to the septum layer and/or liner. The septum layer and/or liner may be connected to the first casing element.

A jet engine fan casing or gas turbine may comprise the turbomachine casing assembly described above.

BRIEF DESCRIPTION OF THE DRAWINGS

For a better understanding of the present invention, and to show more clearly how it may be carried into effect, reference will now be made, by way of example, to the accompanying drawings, in which:

FIG. 1 shows a prior art arrangement of a fan casing;

FIG. 2 shows a previously-proposed sectional side view of a turbomachine casing assembly; and FIG. 3 shows a sectional side view of a turbomachine casing assembly according to an example of the present invention.

DETAILED DESCRIPTION

With reference to FIG. 3, a turbomachine casing assembly 100, according to an example of the present disclosure, comprises a first casing element 110 and a second casing element 120. The first casing element 110 at least partially encases and surrounds one or more rotating aerofoil structures 130. These aerofoil structures 130 may comprise blades of a turbomachine, in particular compressor fan blades. The second casing element 120 is disposed radially outward of the first casing element 110. The turbomachine casing assembly 100 may comprise a plurality of first casing elements 110 circumferentially disposed about a curve defined by the blade tip path of the one or more aerofoil structures of the turbomachine. The first and/or second casing elements 110, 120 may typically be metallic and may for example be formed of aluminium, titanium, steel or any other metal.

The casing assembly 100 may be provided with an infill member 160, e.g. a structural and/or acoustic liner between the first and second casing elements 110, 120. The infill member 160 may be a frangible or crushable structure, such as an acoustic foam or honeycomb. Furthermore, there may be a gap 163 between the infill member 160 and the second casing element 120 (as shown in FIG. 3), or the infill member 160 may abut both the first and second casing elements 110, 120 (not shown). The infill member 160 may be made from an Aluminium honeycomb or may be made from any other honeycomb formed from other metals or resins. For example, one preferred non-metallic material is Nomex (a registered trademark for flame resistant meta-Aramid material). The Aramid sheet may be saturated with a Phenolic resin. Alternatively the honeycomb may be replaced by a metal or synthetic foam.

Each first casing element 110 may comprise a curved panel, which may be in the form of an attrition liner 112. An exemplary material for the attrition layer is an epoxy resin, which may be curable at room temperature. The attrition liner 112 may provide a surface against which the aerofoil structure 130 is able to rub and cut a path for itself. For example, the fan blades may rub against the attrition liner 112 and form a seal during normal engine operation.

The attrition liner 112 may be attached to a backing tray or septum layer 114. Each liner 112 and septum layer 114 may form an arc of a sector such that the fan casing assembly comprises multiple sectors. The septum layer 114 may be metallic or may be formed from a carbon fibre or glass fibre reinforced polymer. The septum layer may provide stabilisation for the infill member 160 and may provide a backing sheet for the attrition liner 112. The combination of attrition layer 112 and septum layer 114 may form a load spreader such that ice or fan blade-off loads are distributed as far across the infill member 160 as possible.

The septum layer 114 may be axially longer than the attrition liner 112 and as such the septum layer 114 and attrition layer 112 may form an abutment shoulder 116 where the septum layer overlaps the attrition layer. The abutment shoulder 116 may be formed at a forward end of the first casing element 110. Although not shown in FIG. 3, the septum layer and attrition layer may also form an abutment shoulder at a rearward end of the first casing element 110.

The second casing element 120 may comprise an aerofoil structure retaining feature, for example a hooked portion 122. The hooked portion 122 may extend radially inwardly and then axially in a rearward direction. The abutment shoulder 116 may interlock with the hooked portion 122 such that the septum layer 114 is disposed radially between the hooked portion 122 and the remainder of the second casing element 120.

As shown in FIG. 3, the infill member 160 may terminate at a point set back from an end or edge of the first casing element 110, e.g. an edge of the septum layer 114 or attrition layer 112. In other words, a termination, e.g. an end wall 161, of the infill member 160 may be set back from an edge of the first casing element such that a void 162 may be provided between the first and second casing elements 110, 120. The infill member 160 and void 162 may be provided between first and second portions respectively of the first and second casing elements 110, 120. The first and second portions of the first and second casing elements may be axially set apart. The first and second portions of the first and second casing elements may be adjacent to one another, e.g. in an axial sense.

In an alternative arrangement (not shown), the void may be filled with a further infill member. The further infill member may be weaker than the infill member 160.

As a result of the end 161 of the infill member 160 being set back, a cantilever structure from the end 161 of the infill member 160 to inside the aerofoil retaining feature, e.g. the hook, is formed. As such, the first casing element may comprise a cantilever 170. The cantilever may be arranged in a region 172 between the edge of the first casing element 110 and a leading edge of the aerofoil structure 130. The cantilever 170 may be arranged such that upon failure of one of the rotating aerofoil structures 130, the cantilever bends into the void 162 provided between the first and second casing elements 110, 120. The length of the cantilever 170 may need to be large enough to provide purchase for the fan blade and/or develop enough bending moment to cause collapse of the cantilever material. The length of the cantilever 170 may be the distance from the aerofoil structure retaining feature 122 to the end 161 of the infill member 160. Alternatively, the length of the cantilever 170 may be the distance from the aerofoil structure retaining feature 122 to a point on the attrition liner 112 approximately opposite the leading edge at the tip of the aerofoil structure 130.

The flexible cantilever 170 is generated by moving the end 161 of the infill member 160 rearward. The cantilever 170 may not be able to withstand the force associated with the buckling of the aerofoil structure 130, e.g. following a blade-off event. Thus the cantilever region 172 may act as a 'trap door' allowing the aerofoil structure tip to enter and engage with the hook 122.

The turbomachine casing assembly 100 may further comprise a backing layer or liner 150. The liner 150 may be affixed to the infill member 160 and/or the septum layer 114. The infill member 160 may be arranged between the liner 150 and the first casing element 110 in the first portion of the first and second casing elements 110, 120, e.g. in which the infill member 160 is present. The void 162 may be arranged between the liner 150 and the second casing element 120 in the second portion of the first and second casing elements 110, 120, e.g. in which the void 162 is present. Accordingly, the void 162 and infill member 160 may be separated by the liner 150 and the end wall 161 of the infill member 160 may be covered by the liner 150. The liner 150 may be omitted and the termination of the infill member 160 may be defined by the end wall 161 itself. The liner 150 may be formed from a carbon fibre or glass fibre reinforced polymer. The liner 150 may provide structural stiffness to the casing assembly and may also provide locations for attachment to the engine structure. In the case that a liner 150 is provided, the stiffness of the liner 150 may be selected to provide a desired radial stiffness both in a local and global (e.g. hoop) sense.

The turbomachine casing assembly 100 may further comprise a fastener 180 arranged to connect the first casing 110 element to the second casing element 120. For example, the fastener 180 may connect the first casing element 110 to the aerofoil structure retaining feature 122. The fastener 180 may connect to the first casing element 110 via the septum layer 114 and/or liner 150. The fastener 180 may comprise a nut and bolt assembly, which may be located in holes provided in the aerofoil structure retaining feature 122, septum layer 114 and/or liner 150. The fastener 180 may be frangible so that it breaks in the event of a blade-off.

The performance of the cantilever 170 may be independent of the angle of the liner 150 or the end wall 161 at the termination of the infill member 160. The fastener 180 may fail in preference to the infill member 160. Nevertheless, the angle of the infill member end wall 161 and any local support from the infill member 160 may be selected to ensure that the fastener 180 fails before the infill member 160.

A benefit of the casing assembly 100 disclosed herein is that the cantilever 170 is weaker than previous arrangements and therefore more closely matched to the reduced load provided by the ice shedding process in this area. Furthermore, since the cantilever 170 is weaker than the previous arrangement, it may not be capable of withstanding the blade-off loads. As a collapsing aerofoil structure passes over the cantilever region 172, the liner structure may readily collapse and allow the aerofoil structure tip to engage with the hook 122. This may assist the current weight reduced fan blade designs to satisfactorily penetrate the liner and engage the hook following a fan blade-off event.

The casing assembly disclosed herein is equally applicable to solid and hollow fan blades and may be used with lightweight (hollow line-core or solid composite) fan blades. The casing assembly may also be used with aerofoil structures, e.g. fan blades, comprising a principal load-carrying member at the front of the aerofoil structure such as a picture frame or metallic sheath. The present disclosure may also be applied to swept or unswept aerofoil structures.

Advantageously the present example allows a fan blade to penetrate the first casing element at a forward point (in the case of a blade off event), whilst remaining rigid to ice impact at the rear. The competing requirements of fan blade ice shedding loads and fan blade off loads may be accommodated in a way that was not previously possible. The manner in which this is done allows for the potential to tune the casing assembly to correctly service each requirement and does so whilst saving weight and easing manufacture.

By moving the wall of the infill member rearwards a void is created that would otherwise have been filled with aluminium honeycomb, glue to adhere it to the casing and foaming filler to seal the free edge. The casing assembly of the present disclosure may therefore be lighter. Furthermore, by removing the infill member and the associated materials, unnecessary material is being removed that is just not needed to cope with the ice impact loads and therefore unnecessary margin is not being carried.

The casing assembly of the present disclosure may also be easier to manufacture. For example, the position of the infill member end wall may be chosen to reduce the variation required in the infill member to accommodate the casing profile. In other words, by moving the end wall of the infill member rearward to the point at which the angle of the outer diameter of the casing changes, the difficulty of chamfering different pieces of infill member to fit together is removed and, in particular, the infill member may be made a constant thickness along the main cone of the casing assembly.

A further advantage of the present disclosure may be adjustability and the performance of the casing assembly may be tuned to the particular installation. For example, the thickness of one or more of the liner or septum layer may be varied. The size and number of fasteners may also be varied. In this way, the differing requirements of the fan blade ice shedding loading and the fan blade-off loads may be designed for accurately over a multiplicity of actual installations.

The present invention may be embodied in other specific forms without departing from its spirit or essential characteristics. The described embodiments are to be considered in all respects only as illustrative and not restrictive. The scope of the invention is therefore indicated by the appended claims rather than by the foregoing description. All changes which come within the meaning and range of equivalency of the claims are to be embraced within their scope.

The invention claimed is:
1. A turbomachine casing assembly comprising:
a first casing element arrangeable adjacent to one or more rotating aerofoil structures of a turbomachine;
a second casing element provided at a radially outer position with respect to the first casing element; and
a liner arranged between the first and second casing elements, wherein
an infill member disposed between the first and second casing elements is arranged between the liner and the first casing assembly, wherein the second casing element comprises an aerofoil structure retaining feature, the aerofoil structure retaining feature extending radially inwardly and axially rearwardly from the second casing element, and an end of the infill member is set back from an end of the first casing element such that a void is provided between the first and second casing elements, the void being arranged between the liner and the second casing element, wherein the first casing element comprises a cantilever, the cantilever being arranged in a region between the end of the first casing element and a leading edge of the one or more aerofoil structures, and wherein the aerofoil structure retaining feature is located at an axially forward end of the cantilever.

2. The turbomachine casing assembly of claim 1, wherein the cantilever is arranged such that upon failure of one of the rotating aerofoil structures the cantilever bends into the void provided between the first and second casing elements.

3. The turbomachine casing assembly of claim 1, wherein the void and infill member are separated by the liner.

4. The turbomachine casing assembly of claim 1 further comprising a septum layer arranged between the infill member and the first casing element.

5. The turbomachine casing assembly of claim 4, wherein the septum layer is further arranged between the liner and the first casing element.

6. The turbomachine casing assembly of claim 1 further comprising a fastener arranged to connect the first casing element to the second casing element.

7. The turbomachine casing assembly of claim 6, wherein the fastener connects the first casing element to the aerofoil structure retaining feature.

8. A jet engine fan casing comprising the turbomachine casing assembly as claimed in claim 1.

9. A gas turbine comprising a turbomachine casing assembly as claimed in claim 1.

* * * * *